US008947870B2

(12) United States Patent
Li et al.

(10) Patent No.: US 8,947,870 B2
(45) Date of Patent: Feb. 3, 2015

(54) SLIDING AND ROTATING APPARATUS AND DEVICE HAVING SAME

(75) Inventors: YouQing Li, ShenZhen (CN); Jun Huang, ShenZhen (CN)

(73) Assignee: CBY Holdings, LLC, Boston, MA (US)

( * ) Notice: Subject to any disclaimer, the term of this patent is extended or adjusted under 35 U.S.C. 154(b) by 0 days.

(21) Appl. No.: 12/049,756

(22) Filed: Mar. 17, 2008
(Under 37 CFR 1.47)

(65) Prior Publication Data
US 2009/0231785 A1    Sep. 17, 2009

(51) Int. Cl.
| H05K 5/00 | (2006.01) |
| H05K 7/00 | (2006.01) |
| A47B 96/06 | (2006.01) |
| H04M 1/02 | (2006.01) |
| H04M 1/725 | (2006.01) |

(52) U.S. Cl.
CPC .......... *H04M 1/0237* (2013.01); *H04M 1/0227* (2013.01); *H04M 1/0241* (2013.01); *H04M 1/72544* (2013.01)
USPC ............ 361/679.26; 361/679.27; 361/679.28; 361/679.29; 361/679.44; 248/81

(58) Field of Classification Search
USPC ............. 361/679.01, 679.02, 679.08, 679.09, 361/679.3, 679.55–679.59; 345/156, 157, 345/168, 169, 184; 455/325, 556.1, 550.1, 455/90.1, 575.1, 575.3, 575.4, 575.8; 369/282, 291, 253, 44.16, 75.5; 70/357, 367, 406, 381, 491; 200/329; 174/535; 29/557
See application file for complete search history.

(56) References Cited

U.S. PATENT DOCUMENTS

| 6,751,446 | B1 | 6/2004 | Kim |
| 7,117,564 | B2 | 10/2006 | Jeong |
| 7,158,371 | B2 | 1/2007 | Park et al. |
| 7,200,423 | B2 | 4/2007 | Bum |
| 7,252,511 | B2 | 8/2007 | Santos |
| 7,287,302 | B2 | 10/2007 | Kuramochi |

(Continued)

FOREIGN PATENT DOCUMENTS

| CN | 1156189 | 6/2004 |
| CN | 101061695 | 10/2007 |

(Continued)

OTHER PUBLICATIONS

First Office Action for Chinese Patent Application No. 200980109333.5 (with English Translation).

(Continued)

*Primary Examiner* — Jerry Wu
(74) *Attorney, Agent, or Firm* — Neal, Gerber & Eisenberg LLP (57) ABSTRACT

Disclosed is a sliding and rotating apparatus for connecting two components of a device, such as a portable electronic media player, and a device having the same. The apparatus provides has a base member, a sliding member, and a rotating member. The sliding member is coupled to the base member so as to permit sliding thereon in a first linear direction and between first and second positions, and the rotating member rotationally coupled to the sliding member. The rotating member and base member are configured such that when the sliding member is forced into the second position the rotating member is rotated in a first angular direction. The apparatus also may contain a sliding mechanism that biases the apparatus in either the first or second position.

8 Claims, 8 Drawing Sheets

(56) References Cited

U.S. PATENT DOCUMENTS

| | | |
|---|---|---|
| 7,376,450 B2 | 5/2008 | Chen |
| 7,957,778 B2 | 6/2011 | Makino |
| 2005/0078817 A1 | 4/2005 | Lee |
| 2005/0090298 A1* | 4/2005 | Park et al. .................. 455/575.4 |
| 2006/0009255 A1 | 1/2006 | Vuolteenaho |
| 2006/0046797 A1* | 3/2006 | Chen .......................... 455/575.4 |
| 2006/0053847 A1 | 3/2006 | Taki et al. |
| 2006/0060737 A1 | 3/2006 | Jeun |
| 2006/0061552 A1 | 3/2006 | Santos |
| 2007/0091555 A1 | 4/2007 | Lee |
| 2007/0155451 A1 | 7/2007 | Lee |
| 2007/0204431 A1 | 9/2007 | Scherling et al. |
| 2008/0004083 A1* | 1/2008 | Ohki et al. .................... 455/566 |
| 2008/0026799 A1* | 1/2008 | Makino et al. ................ 455/566 |
| 2009/0029745 A1* | 1/2009 | Eaton ......................... 455/575.1 |

FOREIGN PATENT DOCUMENTS

| | | |
|---|---|---|
| CN | 101115085 | 9/2010 |
| TW | I254199 | 5/2006 |
| WO | WO/2006/053847 | 7/2006 |

OTHER PUBLICATIONS

Extended European Search Report dated Oct. 28, 2011 for EP09722490.1.

* cited by examiner

SLIDING AND ROTATING APPARATUS AND DEVICE HAVING SAME

FIELD OF THE INVENTION

The invention relates generally to sliding mechanisms and applications thereof. More specifically, the invention relates to sliding mechanisms for use with portable compact electronic devices, such as wireless communication devices, interactive entertainment devices, and media-playing devices.

BACKGROUND OF THE INVENTION

Given the continued miniaturization of electronic components, portable electronic devices are being produced that are increasingly capable of complex functions. Accessing these functions often requires the electronic devices to have a large amount of external surface area dedicated to interactive components, such as input keys and buttons, displays, speakers and ports. In order to accommodate these external features while still maintaining their portable size, however, current devices have adapted configurations in which the device can be placed in a compact state with limited functionality, or an extended state with additional functionality.

Examples of such configurations are slider and flip-type phones, in which two separate casings of the phone are joined together by sliding and flipping hinges, respectively. These hinges allow the device to generally remain in a relatively compact state, and to expand by sliding or flipping the separate casings to reveal additional external components—usually keyboards, keypads or additional displays. However, the hinges used to achieve these configurations are generally limited in their complexity due to cost and size considerations. As a result, there are many expanded configurations that, although desirable for certain portable applications, cannot be realized using current portable hinges.

In addition, current portable electronic devices do not lend themselves to standalone applications. Specifically, portable electronic media playing devices do not generally come equipped with adequate speakers for listening to media audio. Instead such devices require headphones or external docking stations in order to generate ambient audio suitable for a small room or office setting. As a result, these devices are ill-suited for individual media and music playback without the aid of external components.

SUMMARY OF THE INVENTION

According to one aspect, the invention concerns a sliding and rotating apparatus for joining a first component and a second component, where the apparatus has a base member, a sliding member slidably coupled to the base member such that the sliding member can slide between first and second positions on the base member, a rotating member rotationally coupled to the sliding member, and where the rotating member and base member are configured such that when the sliding member is forced into the second position the rotating member is rotated in a first angular direction. When the sliding member is forced into the second position, the rotating member may substantially rotate ninety degrees in the first angular direction.

To force rotation in the rotational member, the rotating member may have a protrusion that extends into an opening in the base member, where the opening has a guiding groove such that when the sliding member is forced into the second position the protrusion enters the guiding groove. The guiding groove may then act upon the protrusion so as to cause the rotating member to rotate in the first angular direction. In addition, when the sliding member is in the second position, the guiding groove may act upon the protrusion so as to prevent the sliding member from being forced into the first position unless the rotating member is sufficiently rotated in a second angular direction opposite the first angular direction.

The apparatus may further include a spring mechanism that biases, or forces, the sliding member into either the first or second position. The spring mechanism may act such that when the apparatus is in the first position, movement towards the second position causes the spring mechanism to store energy in one or more springs up to a trigger point, at which point the spring mechanism releases its stored energy and forces the apparatus into the second position. The spring mechanism may include one or more torsion springs, each coupled to both the base member and sliding member.

The apparatus may also be designed to restrict certain sliding and rotating motions in certain positions. The rotating member and base member may be configured such that when the sliding member is in the second position, the sliding member is prevented from being forced into the first position unless the rotating member is first rotated sufficiently in a second angular direction opposite the first angular direction. The rotational member may also be prevented from rotating when the apparatus is in the first position. More specifically, the rotational member may have a locking tab extending radially from a central axis, and the sliding member may have stop pin arranged such that when the sliding apparatus is in the first position, the stop pin engages the locking element and prevents the rotational member from rotating.

In another aspect, the invention concerns a portable electronic device having a front section and a rear section, and a sliding a rotating apparatus that slidably and rotationally couples the front section to the rear section. Through the apparatus, the portable electronic device may be placed in a compact position or an extended (deployed) position. The sliding and rotating apparatus of the portable electronic device may be one that has a base member, a sliding member slidably coupled to the base member such that the sliding member can slide between first and second positions on the base member, a rotating member rotationally coupled to the sliding member, and wherein the rotating member and base member are configured such that when the sliding member is forced into the second position the rotating member is rotated in a first angular direction. The rear section of the portable electronic device may also have one or more panels that are revealed to the user when the slide member is placed into the second position, thereby placing the device in a deployed position. The rear section may also have one or more supports that can be extended therefrom, and which may serve to support the device in a generally upright or vertically leaning position.

In yet another aspect, the invention concerns a portable music player having a front section and a rear section, and a sliding and rotating apparatus that slidably and rotationally couples the front section to the rear section. Through the apparatus, the portable music player may be placed in a compact position or an extended (deployed) position. The sliding and rotation apparatus of the portable music player may be one that has a base member, a sliding member slidably coupled to the base member such that the sliding member can slide between first and second positions on the base member, a rotating member rotationally coupled to the sliding member, and wherein the rotating member and base member are configured such that when the sliding member is forced into the second position the rotating member is rotated in a first angular direction. The rear section of the portable music player may also have one or more speakers contained therein. These speakers may be substantially hidden from the user when the music player is in the compact mode, and may be revealed when the slide member is in the second extended or deployed position. The rear section may also have one or more supports that can be extended therefrom, which may serve to support the device in a substantially upright or vertically leaning position.

An advantage of the present invention is that it enables the creation of portable devices with more complex compact and deployed configurations. The present invention permits for deployed configurations in which two components of a portable device are linearly and rotationally displaced with respect to one another.

Another advantage of the present invention is that it provides users with the ability to use portable electronic devices as standalone, self-supporting media playing devices. The invention provides for both a compact device arrangement that enables portable playback, and an expanded, deployed device arrangement suitable for ambient playback without the need for external devices.

Another advantage of the present invention is that it provides users with the ability to deploy a portable device in a more ergonomic configuration. More specifically, the rotational and sliding capabilities enabled by the invention enable devices to expand in multiple directions for increased ease of use and display of components.

These and other aspects and advantages will become apparent to those of ordinary skill in the art by reading the following detailed description, with reference where appropriate to the accompanying drawings. Further, it should be understood that the foregoing summary is merely illustrative and is not intended to limit the scope of the invention as claimed.

BRIEF DESCRIPTION OF THE DRAWINGS

The invention is described below in connection with the following illustrative figures, wherein similar numerals refer to similar elements, and wherein.

DETAILED DESCRIPTION

A sliding and rotating apparatus and a portable device having such an apparatus therein are disclosed. In the following description, numerous specific details are set forth in order to provide a thorough understanding of the present invention. It will be understood, however, by one skilled in the art, that the present invention may be practiced without limitation to these specific details, or without some of these specific details. In other instances, well-known methods and structures have not been described in detail so as to avoid unnecessarily obscuring the present invention.

Figure 1:
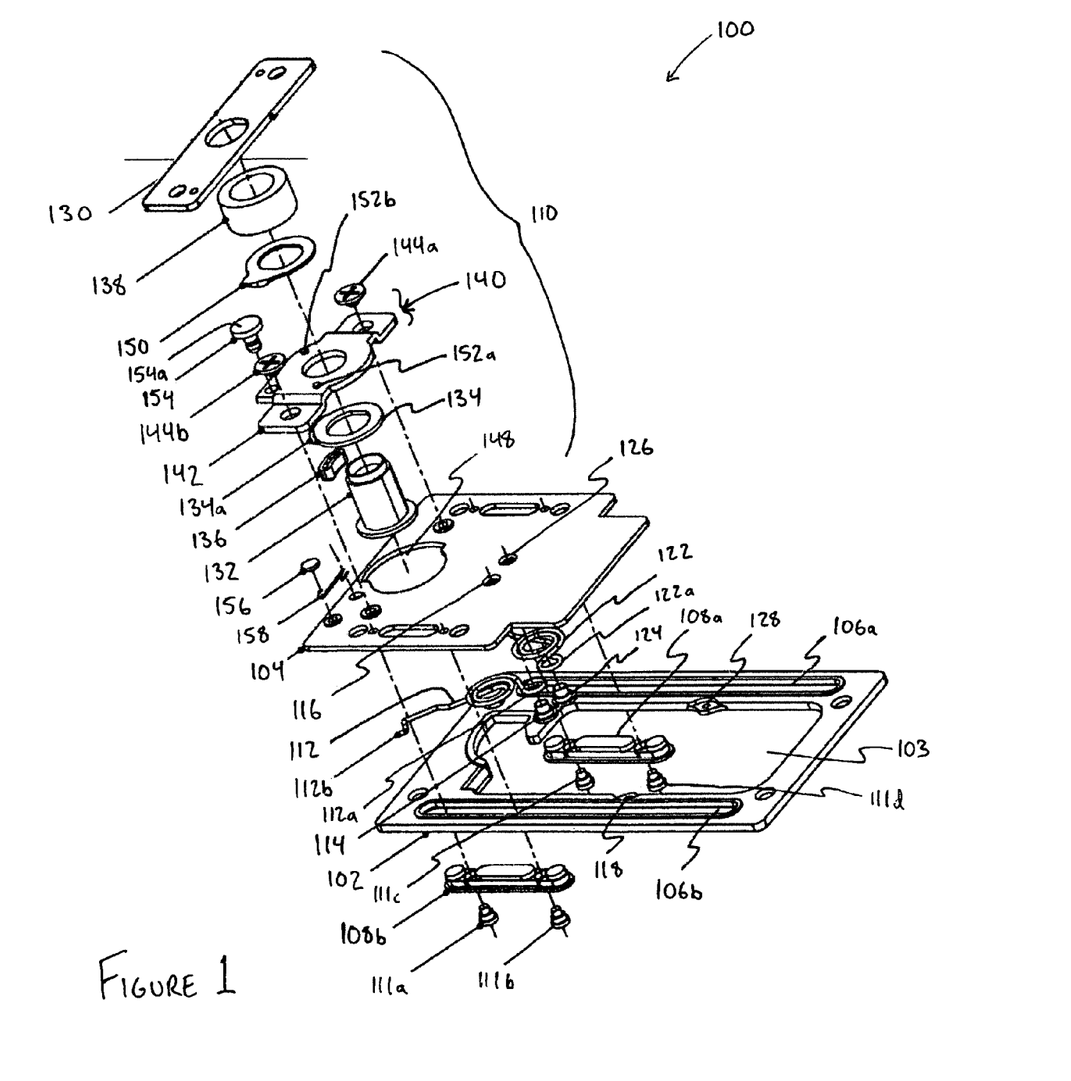
FIG. 1 is an exploded perspective view of a sliding and rotating apparatus according to a first embodiment of the invention.

FIG. 1 is an exploded perspective view of a sliding and rotating apparatus 100 according to a first embodiment of the invention. The sliding and rotating apparatus 100 of this embodiment includes a base member 102, a sliding member 104, and a rotating member 110.

The sliding member 104 is connected to the base member 102 so as to permit the sliding member 104 to slide along the length of the base member 102. The sliding member 104 can slide between first and second positions at opposite ends of the length of base member 102. Base member 102 has a top end and a bottom end, where the top end is associated with and corresponds to the location of the sliding member in the first position, and where the bottom end is associated with and corresponds to the location of the sliding member in the second position. The sliding member also has a top end and a bottom end, whose orientations are consistent with the ends of the base member.

The base member 102 includes a rectangular plate having guide rails 106a and 106b located on opposite longitudinal parallel sides of the plate. The guide rails 106a and 106b each comprise longitudinal channels cut into the base member plate, which facilitate and guide the sliding of sliding member 104 on base member 102. On the rear face of base member 102, guide rails 106a and 106b have inner circumferential rims formed along the perimeter of the channels. These raised rims create a slight gap in between the base member 102 and sliding member 104, and facilitate the relative sliding of these elements. On the front face of base member 102, guide rails 106a and 106b have inner circumferential groves formed along inner channel perimeters to accommodate sliders 108a and 108b. Sliders 108a and 108b fit within the channels of guide rails 106a and 106b, and engage the guide rails along the inner circumferential groves formed therein. Sliders 108a and 108b are coupled to sliding member 104 through the guide rail channels via rivets 111a and 111b, and 111c and 111d, respectively. Thus sliders 108a and 108b are fixedly coupled to sliding member 104 and loosely engaged with base member 102 via the guide rails 106a and 106b. Sliders 108a and 108b therefore serve to slidably couple the sliding member and the base member.

Alternatively, other means or combination of known techniques may be used to connect the sliding member 104 to the base member 106 so as to permit the sliding member 104 to slide along the length of base member 102.

The sliding and rotating apparatus may also comprise a spring mechanism that biases, or forces, the apparatus into one of two positions. This spring mechanism may be any device or combination of devices that can bias a sliding device in two distinct positions. More specifically, the spring mechanism acts such that when the apparatus is in the first position, movement towards the second position causes the spring mechanism to store energy in one or more springs up to a trigger point, at which point the spring mechanism releases its stored energy and forces the apparatus into the second position. Similarly, the spring mechanism acts such that when the apparatus is in the second position, movement towards the first position causes the spring mechanism to store energy in one or more springs up to a trigger point, at which point the spring mechanism releases its stored energy and forces the apparatus into the first position.

Referring to FIG. 1, the sliding and rotating apparatus 100 has a spring mechanism comprised of first and second torsion springs 112 and 122, respectively, with each spring attached to sliding member 104 and base member 106. First and second torsion springs 112 and 122 are each wound about a winding direction (clockwise or counter-clockwise). Each torsion spring generally acts to resist the compression of its respective ends in the winding direction.

First torsion spring 112 has a first end 112a rotationally coupled to sliding member 104 via rivet 114 through the first rivet attachment hole 116. The first end 112a is engaged with rivet 114 such that first torsion spring 112 can rotate, or pivot, around rivet 114. First torsion spring 112 has a second end 112b coupled to base member 102 through first spring attachment hole 118, such that the second end 112b is free to rotate, or pivot, about the first spring attachment hole 118. Second end 112b is crimped so as to keep the first torsion spring 112 engaged with the base member 102.

Similarly, second torsion spring 122 has a first end 122a rotationally coupled to sliding member 104 via rivet 124 through the second rivet attachment hole 126. Second torsion spring 122 also has a second end (not visible) coupled to base member 102 through second spring attachment hole 128, such that the second end is free to rotate, or pivot, about the second spring attachment hole 128. As with the first torsion spring, the second end of the second torsion spring is crimped so as to keep the first torsion spring 122 engaged with the base member 102.

The respective windings 112c and 122c of the first and second torsion springs are disposed such that neither winding interferes with the other's rotation about rivets 114 and 124.

As noted above, each torsion spring generally acts to resist the compression of its respective ends in the winding direction. This resistance, in combination with the ability of each torsion spring to pivot with respect to its connections with the base member 102 and sliding member 104, substantially forces the sliding member to complete a transition between a first and second position (or equally, a transition between the second and first position) once a portion of the transition has been effected by an outside force.

Figure 2:
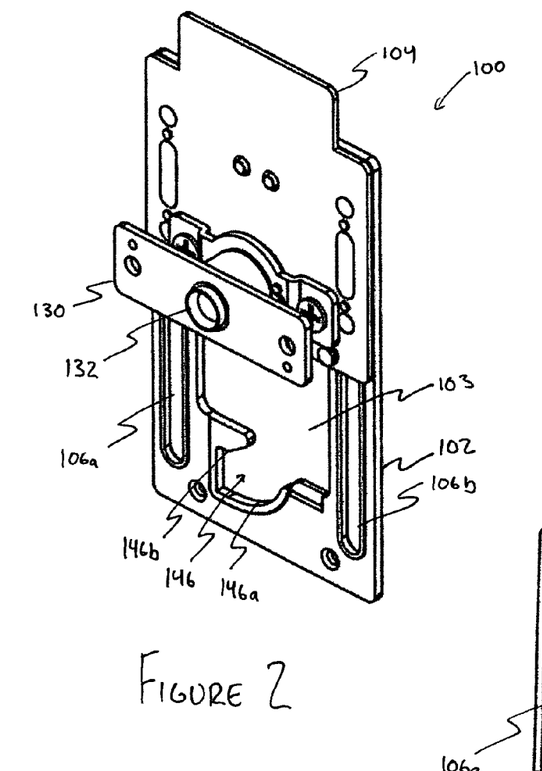
FIG. 2 is a rear perspective view of a sliding and rotating apparatus in a first position according to a first embodiment of the invention.
Figure 3:
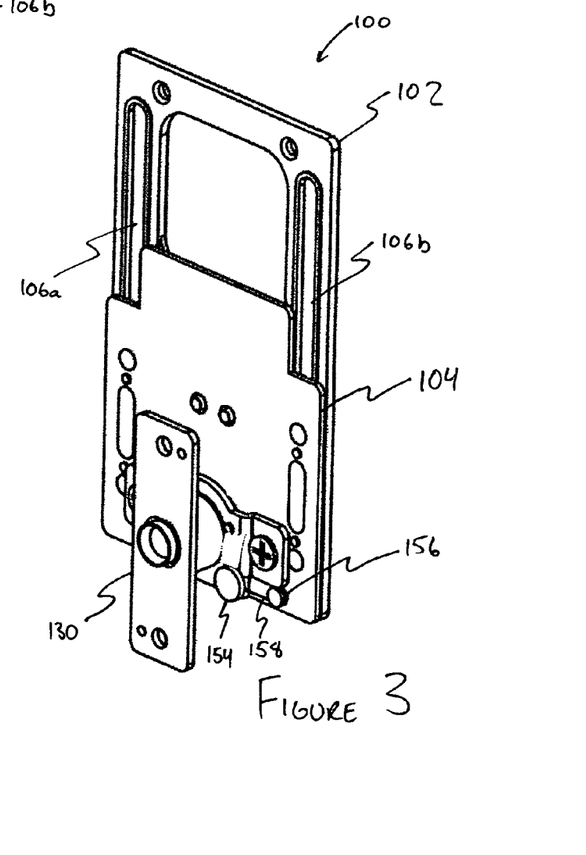
FIG. 3 is a rear perspective view of a sliding and rotating apparatus in a second position according to a first embodiment of the invention.

FIG. 2 is a perspective view of a sliding and rotating apparatus 100 in the first, compact position according to a first embodiment of the invention. In contrast, FIG. 3 is a perspective view of the sliding and rotating apparatus 100 in the second, operational (or deployed) position. The sliding mechanism acts to bias the apparatus 100 into either the first or second position. Referring to FIG. 2, sliding member 104 is located at the top end of the base member with further movement away from the center of the base member restricted by sliders 108a and 108b engaging the ends of the channels of guide rails 106a and 106b, respectively. When a linear external force is applied to the sliding member 104 that forces it towards the bottom end of base member 102, compression of the torsion springs in the spring mechanism initially acts to resist this external force and biases the sliding member from moving out of the first position. However, once the sliding member 104 has been moved in the first linear direction beyond a certain "trigger" point, the spring mechanism ceases to resist the external force, and instead drives the sliding member 104 towards the bottom end of base member 102. The spring mechanism drives the sliding member 104 towards the bottom end until further movement of the sliding member is restricted by sliders 108a and 108b engaging the opposite ends of the channels of guide rails 106a and 106b, respectively. This results in the sliding member being forced into the second, or operational, position at the bottom end of the base member as shown if FIG. 3.

Once the sliding and rotating apparatus 100 is in the second position, the sliding mechanism similarly acts to keep the sliding member 104 from moving out of the second position. Similarly, once the sliding member 104 has been moved by an external force out of the second position and towards the top end of the base plate and beyond the trigger point, the spring mechanism drives the sliding member 104 towards the other top end of base member 102 and into the first position (as illustrated in FIG. 2).

Figure 4:
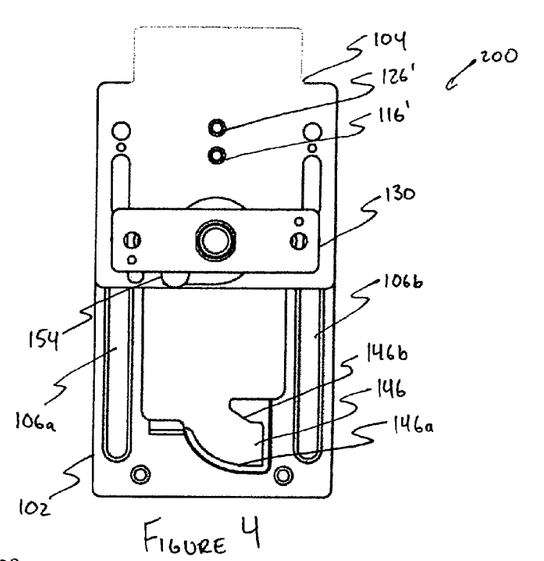
FIG. 4 is a rear view of a sliding and rotating apparatus in a first position according to a second embodiment of the invention.
Figure 5:
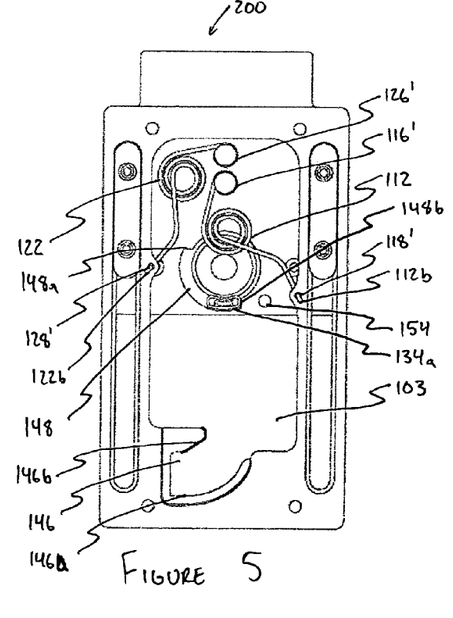
FIG. 5 is a front view of a sliding and rotating apparatus in a first position according to a second embodiment of the invention.
Figure 6:
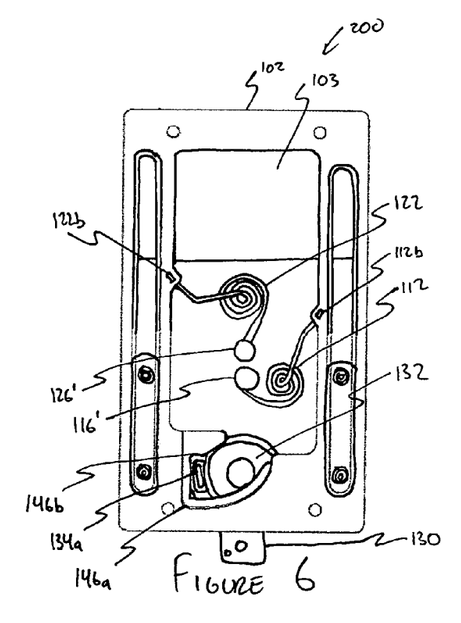
FIG. 6 is a front view of a sliding and rotating apparatus in a second position according to a second embodiment of the invention.

A more detailed description of the functionality of a sliding mechanism comprising two torsion springs, in relation to the overall operation of a sliding and rotating apparatus, is provided with respect to FIGS. 4-6. FIG. 4 is a rear view of a sliding and rotating apparatus 200 in a first position according to a second embodiment of the invention, while FIG. 5 is a front view of the sliding and rotating apparatus 200 in a first, or compact, position. FIG. 6 is a front view of the sliding and rotating apparatus 200 in a second, or operational, position. A substantial difference between apparatus 100 and 200 is the layout and location of attachment holes 116 and 126 in the sliding member, and the location of attachment holes 118 and 128 on the base member. In apparatus 100 attachment holes 116 and 126 are located at the same horizontal position along the linear axis, while in apparatus 200 analogous attachment holes 116' and 126' are staggered vertically on a common linear axis. Also, in apparatus 100 attachment holes 118 and 128 are located at the same horizontal position along the linear axis, while in apparatus 200 analogous attachment holes 118' and 128' are staggered vertically with respect to the linear axis and in relation to the relative positions of holes 116' and 126'. The vertical orientation of holes 116' and 126' in the center of the sliding member 104 allows for a more compact configuration of apparatus 200, while the coordinated staggering of corresponding holes 118' and 128' provides for a consistent trigger point. Overall, the functionality of the sliding mechanism in apparatus 200 as described below is the same as that of the apparatus 100.

Referring to FIG. 5, with sliding member 104 in the first position, first and second torsion springs 112 and 122 are only partially compressed. The first torsion spring exerts a force that acts to spread the angular distance between first and second ends 112a and 112b—in other words, the force acts to decompress the spring. Similarly, second torsion spring exerts a force to spread the angular distance between its first and second ends 122a and 122b. Given the attachment positions of the spring to base member 102 and sliding member 104, these forces translate into a combined force that biases the base member 102 into the first position. When an external force is applied to the sliding member 104 that forces it towards the center of base member 102, first and second torsion springs are compressed further. The springs resist this compression and produce an opposing force to the external force. This resistance continues until the sliding member 104 is forced substantially to the trigger point.

The trigger point may be considered the point where the first and second torsion springs reach their maximum compression in the given configuration. For sliding and rotating apparatus 200, the first spring 112 reaches its maximum compression when the sliding member is at the point where the first spring attachment hole 118' is located at substantially the same position along the linear axis as the first rivet attachment hole 116'. Similarly, the second torsion spring 122 reaches its maximum compression where the second spring attachment hole 128' is located at substantially the same point along the linear axis as the second rivet attachment hole 126'. Once the sliding member 104 has been forced beyond the trigger point, the torsion springs begin to decompress and force the sliding member to continue its transition into its new position without the need for assistance from any external force. As shown in FIG. 6, in the second position the sliding member is located substantially at the far end of the base member with first and second torsion springs partially compressed.

Thus, where sliding member 104 is in the first, or compact, position, it will remain biased in that position until an external force places it substantially at or just beyond the trigger point, at which point the slide mechanism will automatically act to force the sliding member into the second, or deployed, position. Similarly, where sliding member 104 is in the second position, it will remain biased in that position until an external force places it substantially at or just beyond the trigger point, at which point the slide mechanism will automatically act to force the sliding member into the first position.

Alternatively, the sliding mechanism may contain one or more compression or coiled springs. These springs may be arranged around, or parallel to, a piston having a one end rotationally attached to the base member, and a second end attached to the sliding member. As sliding member is moved from the first position to the second position, the piston and the one or more springs contract with potential energy being stored in the one or more springs. Once the sliding member is moved just beyond the trigger point of the sliding mechanism, the potential energy stored in the one or more springs is released, forcing the apparatus into the second position.

The sliding and rotating apparatus also comprises a rotational member. The rotational member is freely and rotationally coupled to the sliding member so as to permit the rotational member to rotate about an axis normal to the plane of the sliding member. The rotational member, sliding member, and base member are configured such that when the sliding member is forced to slide into the second, deployed position, the rotating member is forced to rotate in a first angular direction.

Referring to FIG. 1, the sliding and rotating apparatus comprises a rotational member 110 having a rotation plane 130 and an axel rivet 132, where rotation plane 130 is fixedly attached to the end of axel rivet 132. Axel rivet 132 is generally cylindrical in shape, having a central shaft with flared ends for riveting. The riveting may serve to fix the rotation plane to the end of the axel rivet. An axel sleeve 138 is fixed about the central shaft of axel rivet 132 in order to secure rotation plane 130 against the riveted end of the axel rivet, and to elevate the rotation plane above sliding member 104. Alternatively, the axel sleeve may be formed into the central shaft of the axel rivet. The axel rivet may have notched or flattened sides to orient any components coupled to its central shaft that may require orientation. Axel rivet 132 is rotationally coupled to sliding plate 104 via an axel bracket assembly, which orients and secures the axel rivet such that the axel rivet 132 can rotate freely about its axis. To this end, the axel bracket assembly of the sliding plate comprises an axel fix bracket 140 having a circular opening formed therein for accommodating and securing the axel rivet. Accordingly, this circular opening may have a circumference that is slightly larger than that of the axel rivet. The axel fix bracket 140 is attached to the sliding plate via attachment screws 144a and 144b, and is generally positioned near the bottom end of the sliding member. Other means for securing the axel bracket to the sliding plate may also be used, including but not limited to soldering of the axel fix bracket to the slide plane, and riveting the axel fix bracket. Alternatively, the axel fix bracket may be formed into or as an extension of the sliding member.

The rotational member also comprises an orientation element that, in combination with the sliding action of the sliding member and through interaction with the base member, causes the rotational member to rotate in a first direction when the sliding member is moved into the second position. Referring to FIG. 1, orientation element 134 is generally ring-shaped with a central opening that fixes the element over the central shaft of axel rivet 132. Where the axel rivet has notched or flattened sides, the central opening of the orientation element may also have corresponding protrusions or flattening so that the element is properly oriented with respect to other components attached to the rivet. Along a segment of its outer edge, orientation element 134 has a protrusion 134a that extends down and into the plane of the base member. The base member has a corresponding curved guiding channel that, when the sliding member is moved into the second position, acts upon the protrusion so as to force the orientation element to rotate. Guiding channel 146 is generally a curved slot formed as an extension of the central opening 103 of the base member. The curvature of the bottom wall 146a of the guiding channel dictates the angular direction along which protrusion 134a is guided. Referring to FIGS. 5 and 6, protrusion 134a is located substantially near the bottom end of sliding member 104. As the sliding member is forced into the second position, protrusion 134a enters guiding channel 146 and engages the bottom wall 146a of the channel. Due to the geometry of the guiding channel, as the protrusion is forced downward it is pushed along the curve of the bottom wall of the guiding channel. Because protrusion 134a is coupled to the orientation element 134, which is fixed about the shaft of axel rivet 132, as protrusion 134a is forced along the curve 146a of the guiding channel the axel rivet 132 and all fixedly attached components of rotational member 110 are rotated. With reference to FIG. 6, as sliding member 104 is forced into downward, guiding channel 146 pushes the protrusion to the right and induces a clockwise rotation in rotational member 110. Alternatively, the guiding channel may be oriented so as to force a counter-clockwise rotation in rotating member 110. Additionally, the length and degree of curvature of the guiding channel may be adjusted in order to control the range and rate of rotation of the rotational member.

Protrusion 134a may have a covering 136 designed of a material that is relatively softer than the material used to construct the base member or the protrusion. For example, covering 136 may be formed from a polymer or hard plastic. This covering may serve to reduce the friction between the protrusion and the guiding groove, or may serve to reduce the impact of the protrusion engaging the edge of the guiding groove.

Although the rotation of the rotational element is described above due to an interaction between the protrusion of the orientation element and the guiding channel, other known means may be employed to translate the linear motion of the sliding member with respect to the base member into the rotational motion of the rotational member.

The sliding member may have a rotation window formed therein that, in combination with the protrusion of the orientation element, limits the rotation of the rotational element. Referring to FIG. 5, the rotation window 148 is generally an opening in sliding member 104 that accommodates the extension of protrusion 134a into the plane of base member 102. The rotation window has a first edge 148a that corresponds to a first angular limit on the rotation of the rotational member in the first angular direction. When protrusion 134a encounters first edge 148a, the protrusion—and thus the rotating member 110—is blocked from any further rotation in the first angular direction (counter-clockwise as viewed from the rear of the sliding and rotating apparatus device 200). Similarly, the rotation window has a second edge 148b that corresponds to a second angular limit on the rotation of the rotational member in the second angular direction opposite to the first angular direction. When protrusion 134a encounters first edge 148b, the rotating member 110 is blocked from any further rotation in the second angular direction (clockwise as viewed from the rear of the sliding and rotating apparatus device 200). Accordingly, first and second edges 148a and 148b of the rotation window define the angular limits of the arc through which rotating member 110 may rotate. The location of first and second edges 148a and 148b of the rotation window of sliding apparatus 200 are such that the rotation member can only rotate through a ninety-degree window.

Although rotation window 148 is curved and generally resembles an arc, any shape may suffice so long as it comprises edges for limiting the angular rotation window. Similarly, although rotation window 148 is shown as an extension of a circular opening in the sliding plate 104, the actual configuration may vary. For example, as noted above the axel rivet may be directly rotationally coupled to the sliding member, instead of being coupled through a separate axel bracket assembly. The sliding member may therefore have a circular opening therein for accommodating the axel rivet. In such an embodiment, the sliding member may have a rotational window formed therein that can be used to limit the range of motion of the rotational member protrusion, and in effect constrain the limits of rotation of the rotational member. To this end, the rotational window may take the form of a ring segment, or arc, that is concentric with the circular opening that secures the axel rivet. The circular opening and the rotational window may be located near the bottom end of the sliding member, where at least a portion of the rotational window is located nearer to the bottom end of the sliding member than the circular hole.

The rotational member, sliding member, and base member may also be configured such that, when in the second, deployed position, the sliding member is prevented from being forced into the first position unless the rotating member is rotated in the second angular direction opposite to the first angular direction. Referring to FIG. 6, once in the second position the geometry of guiding groove 146 is such that rotational member protrusion 134a is substantially prevented from moving upward. Specifically, if the sliding member is forced upward towards the first position, protrusion 134a engages second edge 146b of the guiding groove, and prevents any further movement upward. By rotating the rotational member in the second angular direction the protrusion is able to clear edge 146b and permit the sliding member to continue motion upward towards the first position. Also, once in the second position rotation of the rotation element in a second angular direction causes protrusion 134a and first curved edge 146a of the guiding groove to interact such that the protrusion 134a and sliding member 104 are forced upward towards the first position.

Figure 7:
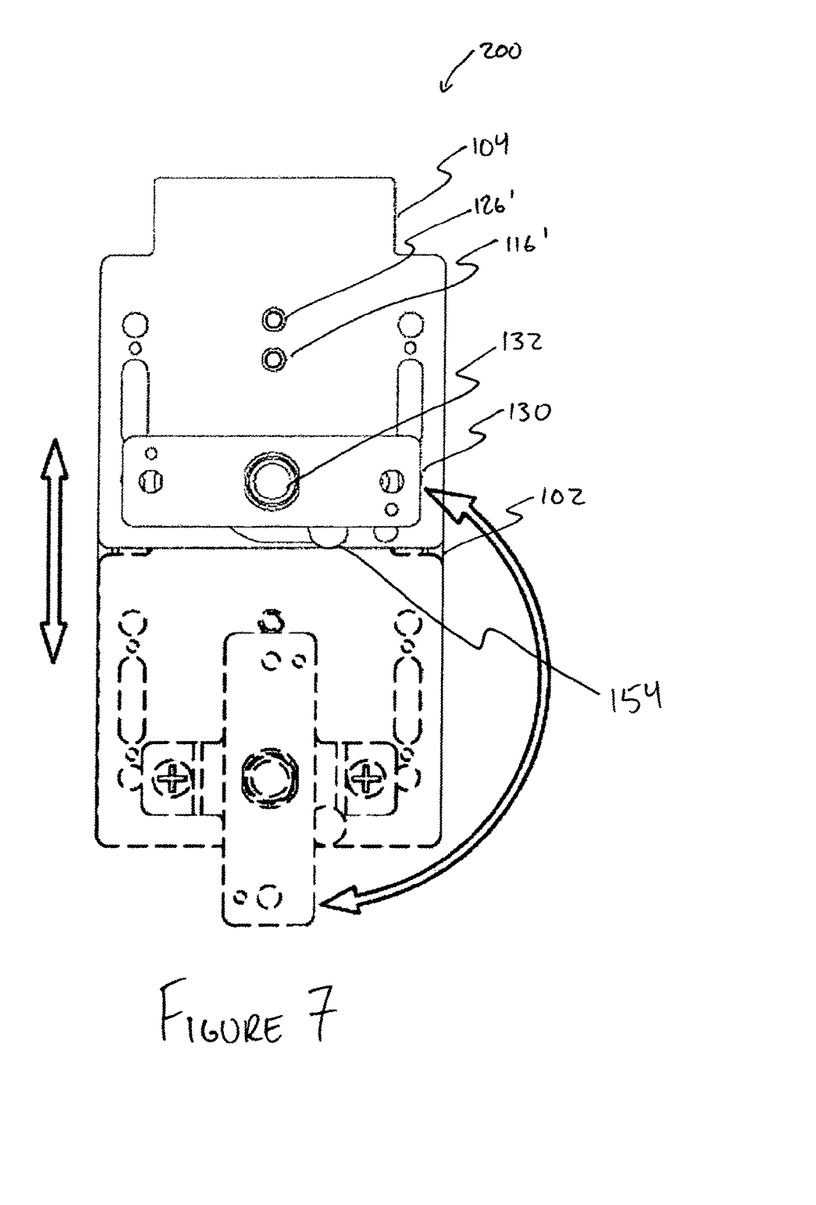
FIG. 7 is a rear view of a sliding and rotating apparatus having been engaged from a second to a first position according to a second embodiment of the invention.
Figure 8:
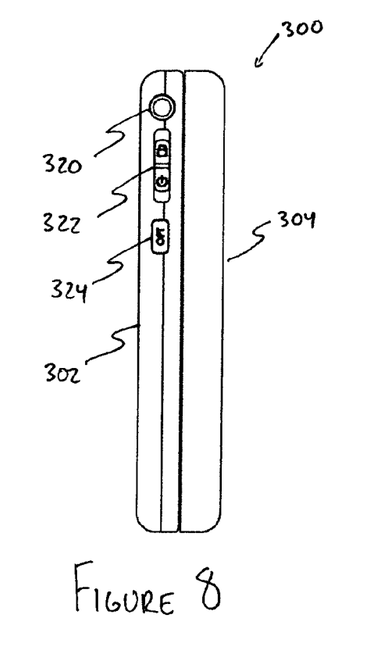
FIG. 8 is a side view of a portable electronic device comprising a sliding and rotating apparatus in a first, compact position according to a third embodiment of the invention.

FIG. 7 is a back view of the sliding and rotating apparatus 200 having been engaged from a second to a first position, which illustrates the rotation of the rotational member between the first and second positions. In the first position, rotating member 110 is oriented such that the rotation plane 130 is horizontally aligned. When the sliding and rotating apparatus 200 is forced into the second position, rotating member 110 and rotation plane 130 are rotated ninety degrees such that the rotation 130 plane is vertically aligned.

Additionally, the rotational member, sliding member and base member may be configured such that, when not substantially in the second position, the rotational member is prevented from rotating. Referring to FIG. 1, rotating member 110 comprises a locking element 150 that is generally ring-shaped with a central opening that fixes the element over the central shaft of axel rivet 132. Locking element 150 has a tabbed portion 150a that extends radially therefrom which, in connection with features of the sliding member 104, substantially prevents the rotating member from rotating when apparatus 100 is in the first position. Axel fix bracket 142 has posts 152a and 152b that extend from the bracket and into the plane of locking element 150. The overall rotation of the locking element 150, and thus the rotating element 130, is limited to the arc between first and second posts 152a and 152b, respectively. While this limitation of rotation may essentially be similar to that provided by the rotation window as described above, this redundancy may provide additional stability to the apparatus.

Referring to FIG. 1, axel fix bracket 142 also has a opening therein to support stop pin 154. Stop pin 154 extends through the opening in the axel fix bracket 142, and has a flattened top portion 154a that generally rests against the axel fix bracket 142 and a bottom portion that generally extends into the central opening 103 of the base member. Known means may be employed to position the front end 154a of the stop pin so that it is generally engaged with the front side of axel fix bracket. In apparatus 100, this positioning is accomplished via a cantilever spring 158 having a first end fixedly coupled to sliding member 140 via rivet 156, and a second end fastened to the bottom portion of the stop pin. Spring 158 is cantilevered so as to generally pull the flattened top 154a of the stop pin towards the axel fix bracket and keep the top engaged with the axel fix bracket, notwithstanding an outside force acting on the stop pin. When sliding and rotating apparatus 100 is in the first, compact position, the tabbed portion 150a of locking element 150 is disposed between first post 152a and the flattened top 154a of stop pin 154. Accordingly, in the first position the rotation of the locking element, and thus the rotational member, is limited by the first post and the stop pin. Specifically, the rotational member is prevented from rotating in the first angular direction by the flattened head of the stop pin resting against the axel fix bracket. Referring to FIGS. 5 and 6, when sliding member 104 is forced downwards towards the bottom end of base member 102, the bottom portion of stop pin 154 encounters central opening edge 103a which pushes against stop pin 154 and forces flattened head 154a away from the surface of the axel fix bracket. With the flattened head of the stop pin pushed out of the way, the tabbed portion of the locking element is free to rotate between the posts on the axel fix bracket. More specifically, the tabbed portion of the locking element is free to rotate in the first angular direction up to second post 152b. As a result, the rotational element and the sliding element are free to complete the transition into the second (deployed) position of the apparatus.

A sliding and rotating apparatus, such as, but not limited to, the sliding and rotating apparatus 100 may be incorporated into a portable electronic media player having a compact state and an expanded operational (or deployed) state. FIGS. 8-13 show several views of a portable electronic device 300 comprising a sliding and rotating apparatus in a first (compact) position according to an third embodiment of the invention. The device may be a portable media player capable of playing, for example and without limitation, the following: music files in digital format (such as, but not limited to, Advanced Audio Coding (AAC), Audible, Audio Interchange File Format (AIFF), ATRAC, AU, CDA, MIDI, MP3, RMA, Vorbis (Ogg Vorbis or OGG), WAV, and Windows Media Audio (WMA)); video files in digital format (such as, but not limited to, AVI, DivX, MPEG, QuickTime (MOV), Real Media (RM), Windows Media Video (WMV), and Xvid); and image files in digital format (such as, but not limited to, Graphic Interchange Format (GIF), JPEG, Tag Image File Format (TIFF), and Windows Bitmap Image (BMP)). Accordingly, the portable electronic device has therein a memory for storing digital media files. The same memory or a separate memory may store instructions for decoding and playing media files, processing user input, communicating with external devices, and responding to changes in input and output states. The portable electronic device also has a processor for executing the stored instructions, and for otherwise decoding and coordinating the playing of media content. The portable electronic device may also have therein an internal rechargeable battery, or a housing for receiving and drawing power from insertable portable batteries. Where the portable electronic device has a display, the portable electronic device may have a display adapter for processing and displaying images on the display. The portable electronic device may also have an input/output interface capable of receiving and sending signals via demodulation and modulation techniques according to known standards.

Portable electronic device 300 has a front section 302 and a rear section 304. The front section may have any combination of display components, input components, input/output terminals, switches and buttons for purposes of manipulating and playing content stored in the device. Front section 302 has a display 306 that can be used to display images, video, or information relating to media content stored on the device, or to otherwise communicate messages and options to a user. Display 306 may be controlled by a display adapter (not visible), which may in turn be connected to a processor (not visible). Front section 302 also has several input components for managing and playing media content stored in the device. These input components include a menu button 308, a play/pause button 310, an advance (forward) button 312, a back (reverse) button 314, and a central slider button 316 that can be used to adjust the volume output of the device or to manipulate a cursor on display 306. Front section 302 also has an input/output interface 318 for connecting to an external device, and sending data to and receiving data from the external device, such as a standard mini-USB 1.0 or 2.0 port.

The portable electronic device may also comprise various hard switches and audio output terminals. Portable electronic device 300 has a standard audio output jack 320 that is capable out outputting audio to external speakers, such as headphones. In addition, device 300 has a sliding hard switch 322 that toggles the power of the device, turning it "on" and "off." Sliding switch 322 may also be placed into a "locked" position, wherein the device will not respond to user input via the input components and will not permit setting changes, or an "unlocked" position, wherein the device will respond to user inputs and will permit setting changes. Device 300 may also comprise a programmable hard switch 324, whose function may be modified by the user. For example, programmable hard switch 324 may be programmed as a "mute" button that can toggle the audio output of the device.

The front section of the device is slidably and rotationally coupled to the rear section via a sliding and rotating apparatus (not shown). Although the sliding and rotating apparatus need not be equivalent to or contain all of the features of apparatuses 100 or 200, for the purposes of illustration, the sliding and rotating coupling of front section 302 and rear section 304 are described with respect to similar terms as above. The front section is fixedly attached to the base section of the sliding and rotating apparatus, while the rear section is fixedly attached to the rotational member. In the first (compact) position, the sliding and rotating apparatus acts such that, when a user slides the rear section of the device downwards in relation to the front section (or equally, slides the front section upwards in relation to the rear section), the apparatus will respond by continuing the sliding motion and automatically rotating the rear section with respect to the front section until the device is in the second (deployed) position.

Figure 9:
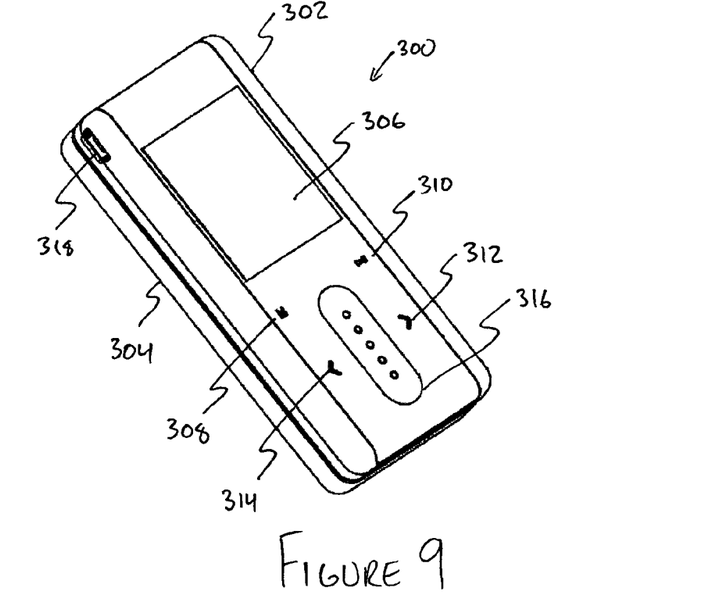
FIG. 9 is a perspective view of a portable electronic device comprising a sliding and rotating apparatus in a first, compact position according to an third embodiment of the invention.
Figure 10:
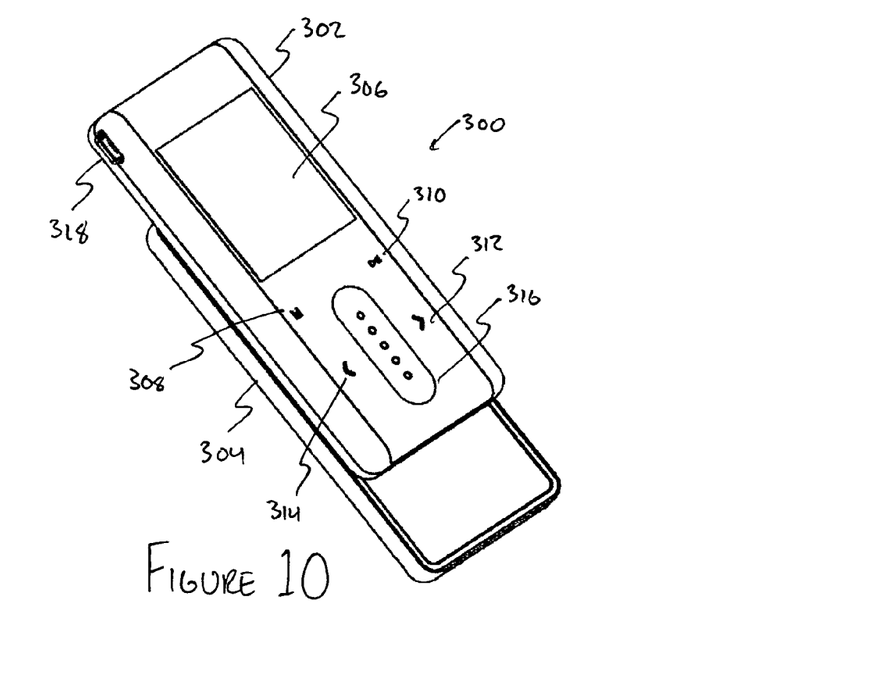
FIG. 10 is a perspective view of a portable electronic device comprising a sliding and rotating apparatus in transition between a first and second position according to a third embodiment of the invention.
Figures 11, 12:
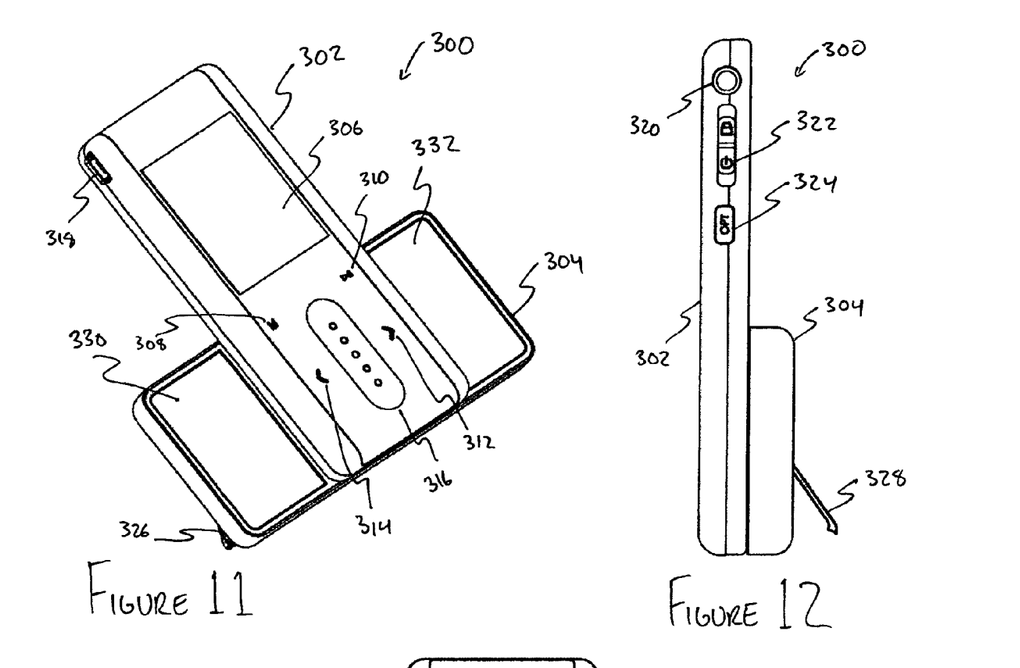
FIG. 11 is a perspective view of a portable electronic device comprising a sliding and rotating apparatus in a second, deployed position according to an embodiment of the invention.
FIG. 12 is a side view of a portable electronic device comprising a sliding and rotating apparatus in a second, deployed position according to a third embodiment of the invention.

FIGS. 9-11 illustrate the transition of the device from the compact position to the deployed position. Initially, the device is in the compact position as shown in FIG. 9. In the compact position, the sliding and rotating apparatus may be designed so as to prevent the front and rear sections from rotating with respect to each other. Alternatively, the front and rear sections may have interlocking components that physically prevent them from rotating with respect to each other. When a user slides the front section upwards in relation to the rear section, the sliding and rotating apparatus approaches and eventually reaches its trigger point, as shown in FIG. 10 where front section 302 is vertically shifted with respect to rear section 304, exposing a portion of the front face of the rear section. At the trigger point, the sliding and rotating apparatus automatically rotates the rear section with respect to the front section in a first angular direction, and completes the transition of the device to the second (deployed) position. As shown in FIG. 11, sliding and rotating apparatus has automatically rotated rear section 312 ninety degrees counter-clockwise with respect to front section 302, exposing a left panel 330 and a right panel 332.

The portable electronic device may also have one or more rear supports that can be deployed by the user such that the device self-supports itself in a relatively upright position.

Device 300 has a left rear hinged support 326 and a right rear hinged support 328 attached to the rear section. Left rear hinged support 326 is attached to the rear face of rear section 304, and near the bottom left portion of the device in the deployed position. Similarly, right rear hinged support 328 is attached to the rear face of rear section 304 and near the bottom right portion of the device in the deployed position. Each support has one end attached to the rear face of rear section 304, and a free end that can be pulled away from the rear section 304 and into a support position. In the compact position, the free ends of supports 326 and 328 are held close to the rear section 304.

Figure 13:
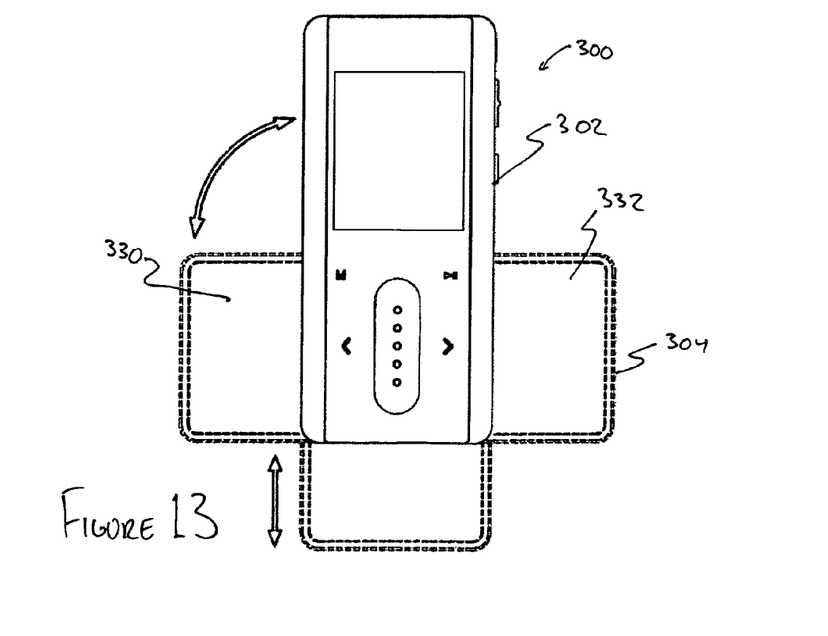
FIG. 13 is a front view of a portable electronic device comprising a sliding and rotating apparatus having been engaged from a second position, through a transition, to a first position according to an embodiment of the invention.

FIG. 13 is a front view of portable electronic device having a sliding and rotating apparatus that has been engaged from a second (deployed) position, through a transition, to a first (compact) position according to an embodiment of the invention. In the deployed position, the rear section and front section of the portable electronic device are restricted from sliding with respect to one another. For the device to transition from the deployed position to the compact position, the rear section is first rotated in a second angular direction opposite the first angular direction, the front section is then slid downwards with respect to the rear section. Once the front section has slid down past the trigger point of the sliding and rotating apparatus joining the sections, the apparatus will then automatically continue the transition until the device is in the first (compact) position.

Figure 14:
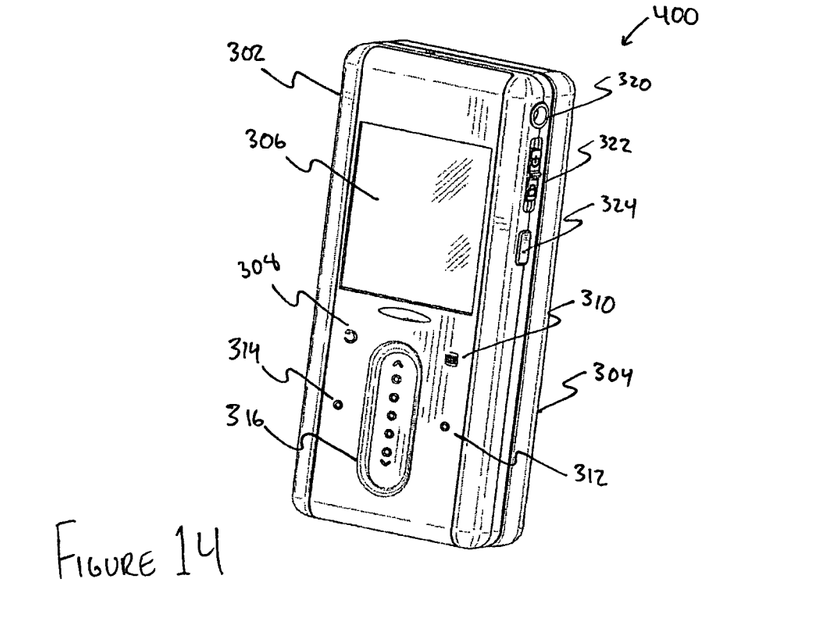
FIG. 14 is a perspective view of a portable music device comprising a sliding and rotating apparatus in a first, compact position.
Figure 15:
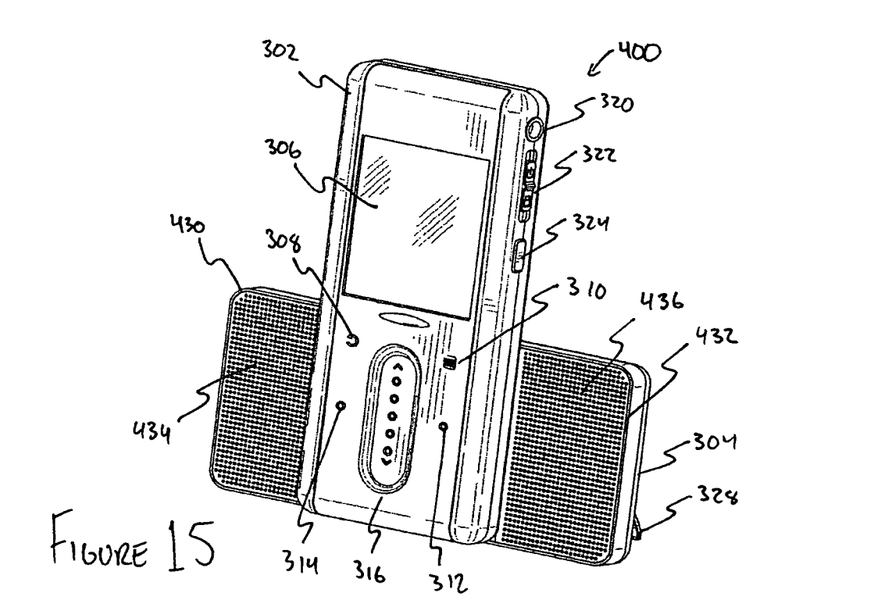
FIG. 15 is a perspective view of a portable music device comprising a sliding and rotating apparatus in a second, deployed position.

FIGS. 14-15 are views of a portable music device 400 comprising a sliding and rotating apparatus in a first (compact) position and a second (deployed) position. The portable music device may contain similar features to the portable electronic device described above including, but not limited to, an internal memory, stored instructions, a processor, a display adapter, an input/output adapter, a power supply, input components and buttons, hard switches, and an audio output jack. In addition, the portable music device has built-in audio speakers. The left panel 430 and right panel 432 of portable music device 400 have therein left and right audio speakers (not visible), respectively. These audio speakers are positioned behind left and right screens 434 and 436, which protect the underlying speakers without substantially dampening the audio generated by the speakers.

The portable music device may also contain deployment sensors and logic for determining when the device is in the second (deployed) position, and generating a corresponding deployment signal. The deployment signal may be utilized by the processor to control the left and right audio speakers. For example, where the deployment sensors determine that the device is in the second position, the deployment logic may send a deployment signal indicating this state to the processor. The processor may then generate a signal enabling the external speakers. Additionally, the processor may generate a signal that disables the audio output jack.

Similarly, where the deployment sensors determine that the device is not in the second position, or that the device is in the first (compact) position, the processor may receive this indication via the deployment signal and may disable the external speakers. Additionally, the processor may enable the audio output jack, where the deployment sensors determine that the device is not in the second position or that the device is in the first position.

Figure 16:
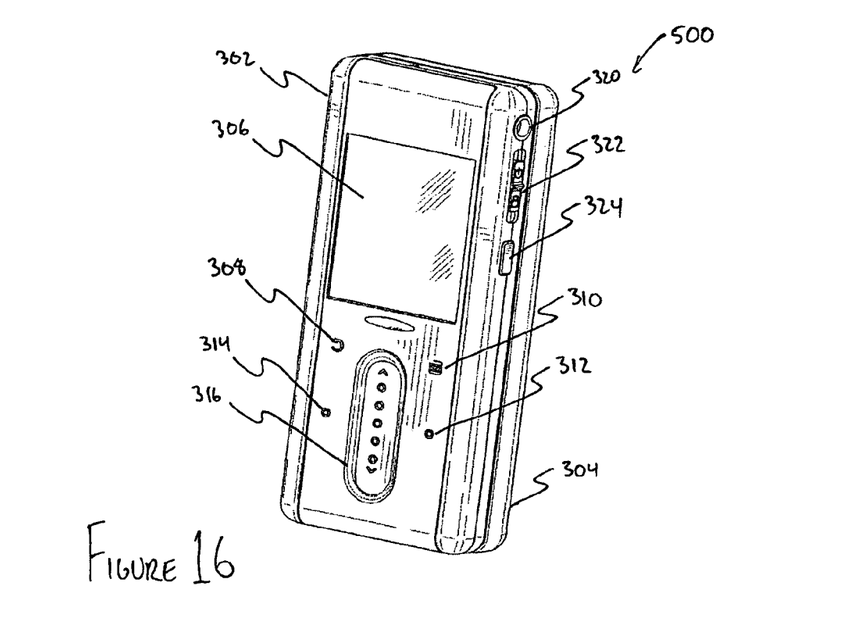
FIG. 16 is a perspective view of a portable electronic gaming device comprising a sliding and rotating apparatus in a first, compact position.
Figure 17:
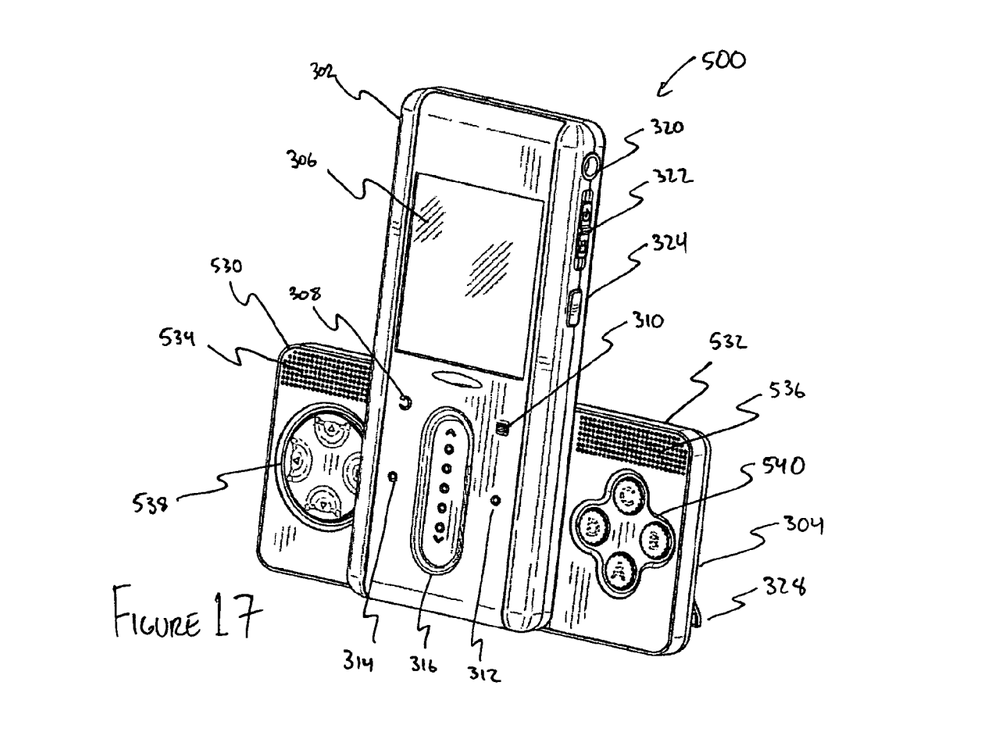
FIG. 17 is a perspective view of a portable electronic gaming device comprising a sliding and rotating apparatus in a second, deployed position.

FIGS. 16-17 are views of a portable electronic gaming device 500 having therein a sliding and rotating apparatus in a first (compact) position and a second (deployed) position. The portable electronic gaming device may contain similar features to the portable music device described above including, but not limited to, an internal memory, stored instructions, a processor, a display adapter, an input/output adapter, a power supply, input components and buttons, hard switches, an audio output jack, audio speakers, and deployment sensors and logic. In addition, the internal memory of the portable electronic gaming device may store instructions for electronic games. The left panel 530 and right panel 532 of portable music device 500 have therein left and right audio speakers (not visible), respectively. These audio speakers are positioned behind left and right screens 534 and 536, which protect the underlying speakers without substantially dampening the audio generated by these speakers.

The portable electronic gaming device may also have a directional keypad or additional input buttons on the left and right panels of its rear section. The directional keypad or additional input buttons may be accessed by the user when the device is in the second (deployed) position. The deployment signal of the electronic gaming device may be used by the processor to enable or disable the directional keypad or additional input buttons, with the keypad and buttons being enabled by the processor when the device is in the second (deployed) position and disabled when the device is not in the second position. In addition, the memory in the portable electronic gaming device may contain stored instructions for interpreting input from the directional keypad and additional input buttons. As shown in FIG. 17, portable electronic gaming device 500 has directional keypad 538 and additional input buttons 540. A user may use keypad 538 and buttons 540 to manipulate cursors and other display figures on the display for purposes of, for example, electronic gaming and entertainment.

While the invention has been described in terms of several preferred embodiments, there are alterations, permutations, and equivalents that fall within the scope of this invention. It should also be noted that there are alternative ways of designing and constructing the apparatus and device of the present invention. It is therefore ultimately intended that the claims below include all such alterations, permutations, and equivalents as fall within the true spirit and scope of the present invention.

We claim:

1. A sliding and rotating portable electronic device comprising:
    a front section; a rear section;
    a sliding and rotating apparatus that slidably and rotationally couples the front section to the rear section, wherein the sliding and rotating apparatus comprises:
    a base member; a sliding member coupled to the base member so as to permit sliding thereon in a first linear direction and between a first position corresponding to a compact arrangement, and a second position corresponding to a deployed arrangement;
    a rotating member rotationally coupled to the sliding member; and
    the rotating member has an element with a protrusion such that the protrusion extends through both of a rotation window in the sliding member and a channel in the base member;
    wherein the rotating member and the base member are configured such that as the sliding member is slid and linearly forced into the second position, the channel pushes the protrusion and forces the rotating member to simultaneously rotat in a first angular direction; and the rotation window limits the rotation of the protrusion such that the rotating member can only rotate ninety degrees in the first angular direction; wherein the front section is attached to the base member and the rear section is attached to the rotating member; and a spring mechanism that forces the apparatus into the first position when the device is in the first position, and that forces the apparatus into the second position when the device is in the second position, wherein the spring mechanism has a characteristic trigger point such that when the apparatus is linearly forced from the first position beyond the trigger point, the spring mechanism forces the apparatus into the second position; and when the apparatus is linearly forced from the second position beyond the trigger point, the spring mechanism forces the apparatus into the first position.

2. The portable electronic device of claim 1 wherein the rear section has a first panel and a second panel, such that the first panel and second panel are substantially hidden when the sliding member is in the first position, and wherein the first panel and second panel are revealed when the sliding member is in the second position.

3. The portable electronic device of claim 1 wherein the rear section has one or more supports such that when in the deployed arrangement, the one or more supports extend from the rear section to substantially support the device in a substantially upright or vertically leaning position.

4. The portable electronic device of claim 1 wherein the device is a music player.

5. The portable electronic device of claim 1 wherein the spring mechanism comprises one or more torsion springs.

6. The portable electronic device of claim 4 wherein the rear section has one or more supports such that when in the deployed arrangement, the one or more supports extend from the rear section to substantially support the device in a substantially upright or vertically leaning position.

7. The portable electronic device of claim 1 wherein the rotational member is prevented from rotating when the apparatus is in the first position.

8. The sliding and rotating apparatus of claim 7 wherein the rotational member comprises a locking element having a tab extending radially therefrom, wherein the sliding member comprises a stop pin, and wherein when the sliding apparatus is in the first position the stop pin engages the locking element and prevents the rotational member from rotating.

\* \* \* \* \*